Jan. 2, 1968  J. C. BOKROS ET AL  3,361,638
PYROLYTIC GRAPHITE AND NUCLEAR FUEL PARTICLES COATED THEREWITH
Filed April 7, 1967
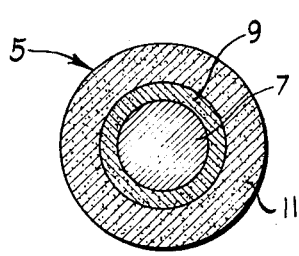
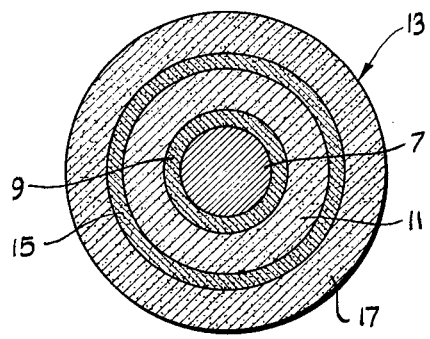
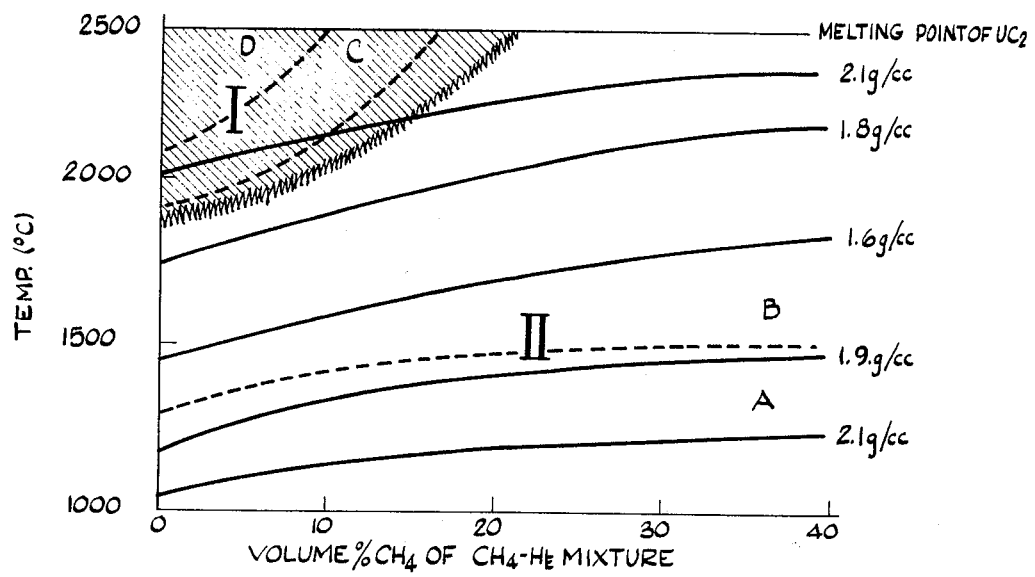
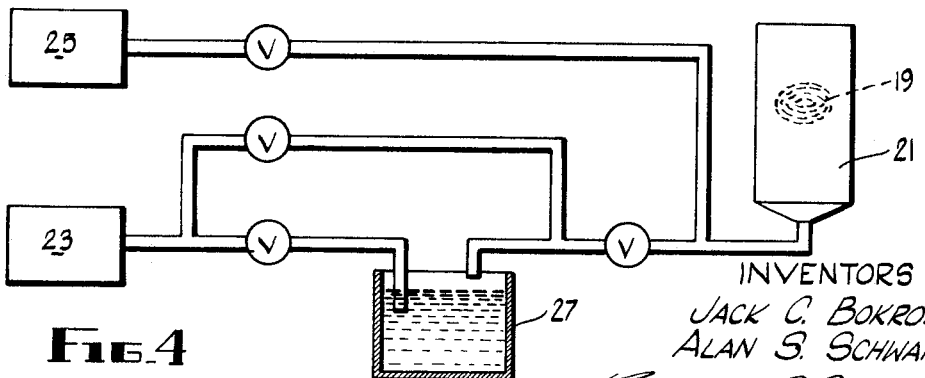
INVENTORS
JACK C. BOKROS
ALAN S. SCHWARTZ
ATTORNEY United States Patent Office 3,361,638
Patented Jan. 2, 1968

3,361,638
PYROLYTIC GRAPHITE AND NUCLEAR FUEL PARTICLES COATED THEREWITH
Jack C. Bokros, San Diego, and Alan S. Schwartz, Del Mar, Calif., assignors to the United States of America as represented by the United States Atomic Energy Commission
Filed Apr. 7, 1967, Ser. No. 629,880
10 Claims. (Cl. 176—67)

ABSTRACT OF THE DISCLOSURE

Nuclear fuel particles with cores of fissile or fertile material completely surrounded by a fission-product retentive layer of true pyrolytic graphite which is produced via deposition from an atmosphere containing a carbonaceous substance, e.g. methane, an inert gas and a metal or metalloid catalyst. A spongy carbon layer is provided immediately adjacent the fuel core, and a silicon carbide layer may be disposed immediately exterior of the graphite coating.

---

This invention relates to pyrolytic graphite and more particularly to nuclear fuel particles having pyrolytic graphite coatings which are designed for use in a high-temperature environment where they will be exposed to high-level irradiation for prolonged periods.

It is well known that pyrolytic carbon coatings are useful in protecting particles of nuclear reactor fuel, i.e., fissile and/or fertile materials, such as uranium, plutonium, and thorium and suitable compounds thereof. Such coatings should desirably have sufficient impermeability to retain volatile fission products within the confines of the coatings. Of course, for the coatings to continue to serve this function throughout the life of the nuclear fuel particles, they should be able to maintain their structural integrity although exposed to high temperatures and irradiation over the prolonged period of reactor operation. Examples of fuel particles employing pyrolytic carbon coatings are disclosed and described in U.S. Patent applications Ser. No. 272,199, filed Apr. 11, 1963, now Patent No. 3,325,363, and Ser. No. 502,702, filed Oct. 22, 1965, now Patent No. 3,298,921. Although these fuel particles are well suited for many nuclear energy applications, nuclear fuel particles having still better characteristics are always desired.

It is an object of the present invention to provide improved pyrolytic graphite and nuclear fuel particles coated therewith having excellent structural stability when subjected to high-temperature operation and/or high-level irradiation for long periods of time. It is another object to provide a coated nuclear fuel particle which has excellent retention of fission products although subjected to operation at high temperatures and high-level fast neutron irradiation for prolonged periods. These and other objects of the invention are more particularly set forth in the following detailed description of the production of articles embodying various features of the invention and in the accompanying drawings wherein:

FIGURE 1 is an enlarged diagrammatic view of a nuclear fuel particle having various features of the invention;

FIGURE 2 is a view similar to FIGURE 1 of another nuclear fuel particle having various features of the invention;

FIGURE 3 is a graphic illustration of pyrolytic carbon which is deposited, in a fluidized bed coater of 3.5 cm. diameter operating at a flow rate of 10,000 cc./min. of gas containing about 0.3 gram Ti per gram of C, upon a bed of particles having an initial surface area of about 2500 sq. cm.; and FIGURE 4 is a schematic illustration of apparatus suitable for the production of fuel particles embodying various features of the invention.

In general, the present invention provides a nuclear fuel particle having a central core of fissile or fertile material surrounded by an outer layer of pyrolytic graphite which has excellent structural and dimensional stability upon exposure to high temperatures and high-level irradiation for long periods. It has been found that pyrolytic graphite of well-defined three-dimensional crystalline structure can be coated upon fissile and/or fertile materials at temperatures which will not undesirably affect these nuclear fuel materials. This coating process is carried out by the thermal decomposition of a carbonaceous component of a gaseous atmosphere to deposit carbon in combination with a catalyst which is also present as another component of this atmosphere. The process for the production of pyrolytic graphite coatings is described in detail in copending application Ser. No. 629,879, filed on Apr. 7, 1967 in the names of Jack C. Bokros, Jack Chin, and Alan S. Schwartz.

The central core of nuclear fuel material which is to be protected may be of any suitable shape. Generally, particulate materials less than a millimeter in particle size are employed. Preferably, spheroids between about 100 microns and about 500 microns in diameter are used, although larger and smaller particles may be used. Core materials in the carbide form are preferred; however, core materials in other suitable forms, such as the oxide, nitride, silicide, may also be employed.

Nuclear fuel materials generally expand at high temperature operation and upon fissioning create gaseous fission products. Some provision should be made to accommodate these effects in particular to allow prolonged operation under exposure to neutron flux. If a dense nuclear fuel core 7 is employed (FIGURES 1 and 2), it is desirable to use a low density layer 9 adjacent the outer surface of the core to provide thermal expansion accommodation at a location interior of the pyrolytic graphite jacket 11. If a porous nuclear fuel core is employed, it may itself provide the desired accommodation so that the pyrolytic graphite jacket may be located directly adjacent the outer surface of the nuclear fuel core. With either of these embodiments, additional layers of suitable substances may be disposed exterior of the pyrolytic graphite jacket, or intermediate the two layers in the multi-layer embodiment, without deviating from the invention. One such embodiment using an additional layer is described hereinafter in detail.

In the multi-layer embodiment, the first layer which surrounds the core should be of a low density substance with is compatible with the nuclear fuel material. For example, carbonaceous materials such as low density isotropic carbon, are suitable for use with many nuclear fuels. The preferred substance is spongy carbon. By spongy carbon is meant a soot-like amorphous carbon which has a diffuse X-ray diffraction pattern and which has a density less than about 50 percent of the theoretical density of carbon, which is about 2.21 grams per cc. Such spongy carbon is porous to gaseous materials and is also compressible. One function of the low density layer on a nuclear fuel particle is to attenuate fission recoils, and another is the accommodation of stresses resulting from differential thermal expansion between the core and the dimensionally stable pyrolytic graphite jacket and from any other dimensional changes in the core due to exposure to neutron irradiation for a prolonged period.

In general, to accomplish the aforementioned functions of stress accommodation and attenuation of fission product recoils so that cracking or rupturing of the outer coating as a result of damage from fission product recoil is avoided, the low density layer should have a thickness at least equal to the fission product recoil range. When spongy carbon is employed, a coating of at least about 25 microns is used and coatings of up to about 80 microns may be employed.

The protective jacket which is disposed exterior of this low density layer is pyrolytic graphite having a well-defined three-dimensional crystalline structure and a layer plane spacing of from 3.35 to about 3.37 A. These measurements are based upon the assumption that 3.35 A. is the layer spacing of perfectly formed graphite. Pyrolytic graphite has outstanding dimensional stability under high temperature and fast neutron irradiation and, as such, is considered to be an excellent material for the coating of nuclear fuel particles. Differentiation between pyrolytic graphite and highly crystalline pyrolytic carbon, which may also be employed for similar purposes on particulate nuclear fuel materials, can be done using X-ray diffraction techniques which are suitable to identify the order in the stacking of the layer planes which is distinctive of the graphite crystalline structure. Measurement of the distance between these layer planes also gives a positive identification that the material is in fact pyrolytic graphite and not pyrolytic carbon of only two dimensional order. The pyrolytic graphite employed to coat the fuel particles should have a layer plane spacing between 3.35 A. and 3.37 A. Turbostratic carbon does not exhibit a layer plane spacing below about 3.44 A. Thus, this criterion provides a positive identification of whether a deposited carbon structure is pyrolytic graphite or highly crystalline pyrolytic carbon.

Another way of identification of the desired pyrolytic graphite is the crystalline height or apparent crystallite size. The apparent crystallite size, herein termed $L_c$, can be obtained directly from the coated particles, using an X-ray diffractometer. In this respect, $$L_c = \frac{0.89 \lambda A}{\beta \cos \theta}$$

$\lambda$ is the wave length in A.
$\beta$ is the half-height (002) line width, and
$\theta$ is the Bragg angle.

The desired pyrolytic graphite should have an apparent crystallite size of at least about 500 A. The $L_c$ provides another way of distinguishing the deposited material because turbostratic pyrolytic carbon normally has a much smaller apparent crystallite size, for example, in the neighborhood of about 30 to 200 A. It has been shown that the dimensional stability of pyrolytic graphite having an apparent crystallite size of about 500 A. or larger remains excellent throughout prolonged exposure to fast neutron irradiation at temperatures above 500° C.

Another characteristic of the pyrolytic graphite is its preferred orientation. The preferred orientation of a carbon structure may be assessed by measuring the physical properties of the carbon or by determining its Bacon Anisotropy Factor by X-ray diffraction. The Bacon Anisotropy Factor is an accepted measure of the preferred orientation of the layer planes in the structure. The technique of measurement and a complete explanation of the scale of measurement is set forth in an article by G. E. Bacon entitled "A Method for Determining the Degree of Orientation of Graphite," which appeared in the Journal of Applied Chemistry, vol. 6, page 477 (1956). A perfectly isotropic carbon is defined as one which measures 1.0, the lowest point on the Bacon scale.

Isotropy in the pyrolytic graphite constituting the fuel particle jackets is desirable. It is preferred that deposition conditions be controlled so that the pyrolytic carbon on the fuel particles has a Bacon Anisotropy Factor of about 1.3 or less. However due to its greater irradiation stability, pyrolytic graphite coatings having B.A.F.'s of greater than 1.3 are satisfactory for many applications because pyrolytic graphite exhibits a much lower rate of distortion under irradiation than does turbostratic carbon having the same B.A.F. The pyrolytic graphite employed should also be dense, preferably at least about 80 percent of maximum theoretical density. The actual specification of the density in units is somewhat difficult because the density of course depends upon the weight of the particular catalyst which is employed and the amount in which the catalyst is employed. If a relatively light catalyst, such as silicon or titanium for example, is employed, the density of the pyrolytic graphite coating will be less than if the same atom percentage of thorium or uranium is employed.

Sufficient of the catalyst should be present to catalyse the deposition or the transformation of the carbon to the graphite crystalline phase. On the other hand however, an excess of catalyst over this amount is not employed because the cost accordingly rises with the amount of catalyst incorporated and an excess is not believed to improve the characteristics of the pyrolytic graphite. Moreover, too large an excess of catalyst may detract from the desired physical properties of the pyrolytic graphite coating. It has been found that the catalyst should be present in the pyrolytic graphite coating in an amount between about 0.25 percent to about 1.5 percent, atoms of catalyst to total atoms of catalyst plus carbon. Because of the temperatures which are employed in the process of producing the pyrolytic graphite, the catalytic material will usually be present in the carbide form in the resultant graphite fuel particle jacket.

In order to change carbon to graphite, high temperatures have previously been used, as for an example, temperatures in the neighborhood of 2700–2800° C. Heating to these elevated temperatures is not only undesirable from a production standpoint but is considered unsuitable when working with nuclear fuel particles. By providing nuclear fuel particles coated with pyrolytic graphite which have not been subjected to temperatures in this elevated range, this invention is considered to increase the stability of the fuel particle. The employment of sufficient catalytic material in the gas stream from which the pyrolytic carbon is deposited permits deposition of pyrolytic graphite coatings of the desired characteristics at temperatures between about 2000° C. and about 2400° C. and at certain hydrocarbon partial pressures. Alternatively, if deposition at low temperatures is desired, it has been found that pyrolytic carbon may be co-deposited with the catalyst in suitable crystalline formation at temperatures as low as about 1200° C. By a subsequent annealing operation at about 2200° C., the carbon deposited in this manner can be crystallized to a fully graphitic structure. Operation in the latter manner may be advantageous because it permits the deposition operation, which requires relatively precise control of different variables, to be performed at a fairly low temperature and followed by a simple annealing process where the only continuous control need be that of the temperature.

Annealing of the fuel particles produced with catalyst distributed throughout the pyrolytic carbon is carried out at a suitable temperature for a suitable time period to cause the crystalline carbon deposited to be crystallized to a fully graphitic structure. If about 2200° C. is employed as the annealing temperature, a time of between about 2 and 8 hours is generally used, and it is not believed necessary to use a time longer than about 8 hours, although longer annealing periods are not considered to have undesirable effects upon the fuel particles. If an annealing temperature of about 2000° C. is employed, then a time period of between about 8 hours and about 20 hours is employed. Although it may be possible to use lower annealing temperatures for still longer times, the periods may be excessive from a production standpoint. It is believed that the graphitic structure which results from carbon deposition at low temperatures followed by annealing in the above-identified manner, because of the uniform distribution of catalyst throughout the carbon coating, is as fully graphitic in physical characteristics as that which is deposited directly in the graphite crystalline form at higher temperatures and low hydrocarbon partial pressures.

The thickness of the overall multi-layer carbon coating which is employed depends in part upon the size of the fuel particle core. As a general rule, the thickness of the composite coating used is equal to at least about 35% of the size or diameter of the nuclear fuel core. The intended use of the fuel particle is another consideration. The 35% general rule set forth above is considered to be adequate for accommodation of fuel burn-up up to about 20% of the metal atoms in the core at a reactor temperature of about 1500° C. and a fast neutron flux of about $1 \times 10^{22}$ nvt (0.18 mev.). Accordingly, if the fuel particles are intended for use to a higher amount of nuclear fuel burnup, a thicker protective coating is employed. Because of the considerations of nuclear reactor design, coatings having thicknesses more than about 50% of the size of the core are generally not employed for nuclear reactor fuels because the thickness of the coating would reduce the fuel loading to volume ratio below desirable minimums.

In addition to providing superior dimensional stability under fast neutron bombardment, as compared to pyrolytic carbon not having a three-dimensional crystalline order, pyrolytic graphite structures are also considered valuable for use in fuel particle protective coatings as support structures for additional fission product barrier materials, such as silicon carbide. Dense silicon carbide (having a density of at least about 95% of maximum theoretical density) is considered to have excellent resistance to the passage therethrough of fission products and are therefore quite valuable as a fuel particle protective coating. However, dense silicon carbide which is suitable to serve as effective diffusion barriers for fission products has a high Young's modulus and is somewhat brittle. Due to silicon carbide's high dimensional stability under irradiation and its brittle character it is susceptible to cracking if subjected to significant strains and stresses.

In a nuclear fuel particle, the nuclear fuel core undergoes expansion and contraction as a result of increase and decrease in temperature and of fuel burnup. The dimensional change in the silicon carbide is far less than that experienced by the nuclear fuel material core. Thus, the silicon carbide layer to retain its effectiveness should be separated from the nuclear fuel core by a substrate material which has a dimensional stability close to the dimensional stability of silicon carbide. Because of the outstanding dimensional stability of pyrolytic graphite, which may be ten times greater than highly crystalline pyrolytic carbon under similar irradiation and temperature conditions (i.e., would undergo a dimensional change of about 10 times less than highly crystalline pyrolytic carbon), a composite fuel particle 13 (FIGURE 2) can be constructed using a layer 11 of pyrolytic graphite to provide a very stable foundation for a silicon carbide layer 15, insulating it from dimensional changes which occur in the nuclear fuel core 7. Thus, the use of pyrolytic graphite permits a silicon carbide barrier layer 15 to be employed in a nuclear fuel particle which will have excellent life expectancy and fission product retention throughout.

In such a composite fuel particle 13 which employs a fission product diffusion-resistant layer 15 of silicon carbide, a continuous layer of silicon carbide between about 5 microns and about 25 microns is generally employed, although even thicker layers may be used in fuel particles of relatively large size. As an interior supporting layer 11 for such a silicon carbide layer, pyrolytic graphite is used in a thickness of at least about 10 microns. The thickness of this pyrolytic graphite layer is generally dependent upon the size of the nuclear fuel core 7, the thickness of the low density intermediate layer 9 and the thickness of the silicon carbide layer 15, together with the thickness of any layers 17 exterior of the silicon carbide if such should be used. As stated previously, the total thickness of the composite coating should be at least about 35% of the diameter.

The silicon carbide may be applied in any suitable manner to give the desired density. An example of one way of applying the silicon carbide diffusion barrier is to initially apply a pyrolytic graphite coating of a thickness which exceeds the desired pyrolytic carbide thickness for the resultant particle by an amount approximately equal to the desired thickness of the silicon carbide layer. These coated particles are then exposed, as in a fluidized bed, to a gas stream containing a suitable silicon compound. Commonly, silicon carbide may be directly deposited from a mixture of hydrogen and methyltrichlorosilane.

In addition to using pyrolytic graphite as an underlying substrate for the silicon carbide layer 15, an exterior layer 17 of pyrolytic graphite can be profitably deposited in a surrounding relation to the silicon carbide so as to sandwich the silicon carbide layer between underlying and overlying pyrolytic graphite layers. The overlying pyrolytic graphite layer 17, as a result of its good dimensional stability provides added structural support for the silicon carbide layer and also prevents any evaporation or erosion of the silicon carbide which could conceivably gradually occur under the environment of high temperature and high level irradiation for prolonged periods, as might be encountered in nuclear reactor operation. An overlying layer of pyrolytic graphite 17 between about 10 and 20 microns thick is usually employed when such an exterior layer is used. Although thicker layers might be used, the aforementioned consideration of fuel loading to volume ratio again may determine whether a thicker exterior layer is feasible for a particular application.

As previously stated, when a porous core of nuclear fuel material is employed, it is acceptable to use only a jacket of pyrolytic graphite instead of the multi-layer embodiment for certain applications. High density pyrolytic graphite is considered to have good resistance to damage from fission recoils so that it may be used immediately adjacent fissionable material, without the protection of a low density spongy layer. The required porosity which the nuclear material core should have to provide the inherent accommodation of the aforementioned effects is dependent upon the contemplated amount of burnup to which the fuel particles will be subjected in their lifetime. For an intended burnup of about 10 atom percent, fuel particles having a density about 85% or less of the theoretical maximum density may be acceptably coated with a single layer of pyrolytic graphite. For greater amounts of burnup, a correspondingly more porous fuel particle core should be employed.

The preferred method of coating the articles with a layer of pyrolytic graphite is by high-temperature decomposition of gaseous hydrocarbons. Other suitable carbonaceous substances that can be pyrolytically decomposed may be employed whether they are in gaseous form at room temperature or can be vaporized at suitable temperatures. Hydrocarbon gases of relatively short carbon chain length, such as butane and below, may be conveniently used. Relatively small particles can be efficiently coated using a fluidized bed 19 (FIGURE 4) in which the hydrocarbon gas, or a mixture of the hydrocarbon gas and a carrier gas, levitates a bed of the particles being coated. FIGURE 3 illustrates the results of fluidized bed coating under conditions using titanium tetrachloride as a catalyst in an amount sufficient to provide about 1.3 atom percent titanium in the deposited carbon, at a total gas flow rate of about 10,000 cc./minute upon a bed of particles having an initial bed surface area of 2500 sq. cm.

The following elements may be used as catalysts to facilitate the production of the graphitic crystalline structure at the desired relatively low temperatures: zirconium, silicon, beryllium, niobium, titanium, vanadium, hafnium, nickel, iron, tantalum, tungsten, molybdenum, chromium, manganese, boron, calcium, scandium, strontium, yttrium, technetium, and the lanthanide and actinide series elements. For purposes of this application, the lanthanide series elements are defined as: lanthanum, cerium, praseodymium, neodymium, promethium, samarium, europium, gadolinium, terbium, dysprosium, holmium, erbium, thulium, ytterbium and lutetium, and the actinide series elements are defined as actinium, thorium, protactinium, uranium, neptunium, and plutonium. These catalysts form carbides which are relatively stable at about 2200° C. and deposit in this form in the coating. Of course, if desired, more than one of these catalysts may be employed at a time. For the catalyst to efficiently perform its catalytic function, it should be distributed uniformly throughout the pyrolytic carbon structure. To achieve this uniform dispersion, it is preferred that the catalyst be included as a component of the atmosphere wherefrom the carbon deposition takes place. Usually the thermal decomposition will not take place from an entirely carbonaceous atmosphere but instead from an atmosphere which is a mixture of a carbonaceous component and an inert component. The catalyst is included as a third component of this atmosphere. For coating nuclear fuel particles, zirconium, silicon, beryllium and niobium are preferred for their nuclear properties.

The catalytic material may be employed as a suitable form of the desired element to be used which facilitates its inclusion as a part of this atmosphere. Generally for handling ease, it is convenient to choose a liquid form of the catalyst and to bubble all or part of the gas mixture through an appropriate container of this liquid body. As a result of the vapor pressure of the particular liquid employed, an appropriate amount of catalytic vapor is picked up in the passing stream and is thus available in the atmosphere from which the pyrolytic deposition is carried out. Generally, all or a portion of the inert gas stream is bubbled through a liquid catalyst. Of course, if a catalyst in gaseous form is available, this can simply be introduced at an appropriate point into the gases which make up the atmosphere. If a solid catalyst is used, it may be heated to an appropriate temperature to increase the vapor pressure thereof, and the gas stream passed thereover.

Sufficient of the catalyst should be present in the deposited pyrolytic carbon to catalyze the formation of the graphite crystalline structure. On the other hand however, an excess of catalyst over this amount is usually not employed because it is not necessary for purposes of the present invention and because the cost accordingly rises with the amount of the catalyst incorporated. An excess of catalyst is not believed to further improve the characteristics of the pyrolytic graphite, and moreover, too large an excess of catalyst may detract from the desired physical properties of the pyrolytic graphite. It has been found that the catalyst should at least be present in the pyrolytic graphite coating in an amount between about 0.5 percent to about 1.5 percent, atoms of catalyst to total atoms of catalyst plus carbon. Generally, not more than about 5 atom percent of catalyst is used, and it is presently expected that about 1.5 to 2.0 atom percent of catalyst will be sufficient for most production applications. Because of the temperatures which are employed in the process of producing the pyrolytic graphite, the catalytic material may be in a carbide form in the resultant pyrolytic graphite structure. Dependent upon the particular deposition conditions used, sufficient catalyst is accordingly provided in the gaseous atmosphere from which deposition is taking place to produce the amount desired in the resultant product to achieve graphitization. Once graphitization has occurred, the catalyst has completed its job and might be removed if removal would not be detrimental to the intended use of the final product, as by treating with chlorine at high temperature to remove the catalyst as a volatile chloride. For example, the catalyst might be leached from the outer coating 17 wherein the resultant increase in porosity would not be of significant importance.

When the low density, spongy, pyrolytic carbon coating is applied by fluidized bed coating, cores 7 may be maintained as a fluidized bed in an upwardly moving stream of helium or some other suitable inert gas and heated to a temperature between about 800° C. to about 1400° C. A substance which is capable of producing low density, spongy, pyrolytic carbon upon decomposition, e.g., acetylene gas at a relatively high partial pressure, i.e., between about 0.65 to about 1.00, is mixed with the stream of helium gas or substituted therefor. At atmospheric pressure and temperatures above 800° C. the acetylene gas decomposes and forms a low density, spongy, pyrolytic carbon coating 9 upon the surface of the cores 7. The flow of acetylene gas is continued until the desired thickness of low density, spongy carbon, e.g., 20 to 80 microns, is deposited upon the surface of the particles.

The crystallite structure and density of the pyrolytic carbon deposited by decomposition of a hydrocarbon gas in a fluidized bed coating apparatus is dependent upon several independent variable conditions of operation including the content of catalyst. In general, as illustrated in FIGURE 4, the gaseous mixture which is fed through a fluidized bed coating apparatus including a reaction tube 21 to create the fluidized bed comprises a hydrocarbon gas, an inert gas and catalyst-containing vapor. This inert gas is generally spoken of as the fluidizing or carrier gas and may be any suitable nonreactive gas, as for example helium, argon, nitrogen, etc., and may be supplied from a suitable source 23 thereof under pressure. For a coating apparatus, the primary variables are the temperature of the fluidized bed, the particular hydrocarbon gas being decomposed, the partial pressure of the hydrocarbon gas in the gas mixture, the amount of catalyst in the gas stream, the ratio of the total deposition surface area in the fluidized bed to the volume of the fluidized bed, and the flow rate of the gas stream.

Methane may be used as the hydrocarbon gas to produce a pyrolytic graphite coating 11 and would be supplied from a suitable source 25 under pressure. The coating conditions under which pyrolytic graphite is deposited from a methane mixture, under certain conditions hereinafter enumerated, are shown in FIGURE 3. In this graph, the bed temperature of the fluidized bed is plotted against the methane concentration in terms of volume percent of the gaseous mixture of methane and helium (total pressure of one atmosphere), the catalyst not being considered in the percentage calculation.

In the area of the graph label I, pyrolytic graphite is deposited directly on the particles being coated, an appropriate amount of catalyst being included. In the area labeled II, pyrolytic carbon is deposited which after annealing is transformed to graphite, an appropriate amount of catalyst being included.

Of course, the other operational variables, hereinbefore mentioned, also affect the crystalline structure of the carbon deposited. In this respect, FIGURE 3 is based upon a fluidized bed surface area (initial) of about 2500 square centimeters in a fluidized bed coater of 3.5 centimeters diameter where the deposition takes place in a cylindrical region about 12.7 centimeters high, a total gas flow of about 10,000 cc./minute (STP) and a concentration of about 0.3 gram of titanium in the gas stream per gram of carbon.

Although from the graph, it may appear that the boundary between Areas I and II is a well-defined line of demarcation, in actuality it should be realized that the transformation from highly crystalline carbon to true pyrolytic graphite is somewhat gradual in the area of the boundary, with the crystalline structure becoming more and more graphitic as you move to the left.

The graph also illustrates other properties of the carbon which is deposited at different temperatures from varying methane-helium percentage mixtures. The lines which run generally across the graph indicate lines of approximate density of the deposited carbon. The amount of titanium present is ignored in calculating these densities so that the values which appear on the righthand side of FIGURE 3 may be considered to be representative of density of carbon which is deposited regardless of the particular catalyst selected. Also indicated, via three dotted lines, are regions of different type crystalline structure. Regions A and B denote the deposition of pyrolytic carbon having a laminar and an isotropic crystalline structure, respectively. Regions C and D, which lie within region I wherein graphite is directly deposited, denote the regions wherein granular and laminar carbon, respectively, would be deposited if no catalyst were included.

The graphite which is deposited directly in region I has a crystalline structure which reflects the type of pyrolytic carbon that would be deposited were it not for the presence of the catalyst. In this respect, the graphite deposited in region D, and also that deposited in region C, will have a higher degree of preferred orientation than graphite deposited in region B, which would otherwise be isotropic pyrolytic carbon, although the carbon is fully graphitic in crystalline structure. Therefore, if it is desired to have a graphite coating which is highly isotropic, it may be desirable to operate in the region near the upper righthand corner of FIGURE 3 and subsequently anneal the pyrolytic carbon to pyrolytic graphite. Moreover, if a high density is desired and the degree of preferred orientation is of little consequence, it may be advantageous to operate at the low temperatures near the bottom of FIGURE 3 wherein a dense laminar pyrolytic carbon is deposited which can be subsequently annealed to dense pyrolytic graphite.

The catalyst is added to the gas stream by diverting at least a portion of the fluidizing gas stream through a chamber 27 wherein the appropriate form of the catalyst is disposed. If a liquid is employed, the fluidizing gas is bubbled through it. If a solid catalyst is used, it is heated to increase the vapor pressure thereof.

The following examples illustrate several processes for producing coated particles having various advantages of the invention. Although these examples include the best modes presently contemplated by the inventors for carrying out their invention, it should be understood that these examples are only illustrative and do not constitute limitations upon the invention which is defined by the claims which appear at the end of this specification.

*Example I*

Particulate uranium dicarbide is prepared having a particle size of about 200 microns and being generally spheroidal in shape. The uranium used contains about 93% enrichment. A graphite reaction tube having an internal diameter of about 2.5 centimeters is heated to about 1100° C. while a flow of helium gas is maintained through the tube. When coating is ready to begin, the helium flow rate is increased to about 1000 cc. per minute and a charge of 50 grams of the cores 7 of uranium dicarbide is fed into the top of the reaction tube. The flow of gas upward through the tube is sufficient to levitate the cores 7 and thus create within the tube a fluidized particle bed.

When the temperature of the fuel particle cores 7 reaches about 1100° C., acetylene gas is admixed with the helium to provide and upwardly flowing gas stream of the same flow rate but having a partial pressure of acetylene of about 0.80 (total pressure 1 atm.). The acetylene gas decomposes and deposits low density, spongy carbon 9 upon the nuclear fuel cores 7. Under these coating conditions, the coating deposition rate is about 15 microns per minute. Flow of the acetylene is continued until a low density, spongy, pyrolytic carbon coating 9 about 25 microns thick is deposited upon the nuclear fuel cores 7. Then, the acetylene gas flow is terminated, and the particles are allowed to cool before their removal from this coating apparatus.

For the deposition of the surrounding coating of pyrolytic graphite, a slightly larger reaction tube 21 having an internal diameter of about 3.5 centimeters is used which is heated to about 2100° C. A flow of helium gas of about 9,700 cc. per minute is passed therethrough. When the tube reaches the desired temperature, a sufficient quantity of the spongy carbon-coated particles are fed into the reaction tube 21 to provide a fluidized bed 19 having a bed surface area of about 800 cm.². When the temperature of the coated fuel particles reaches 2100° C., methane gas is added to the helium stream in an amount of about 300 cc./min. to establish a methane partial pressure of about 0.03 (total pressure 1 atm.), the total flow rate of gas now being about 10,000 cc. per minute. This flow in a 3.5 cm. diameter reaction tube constitutes a contact time of about 0.1 sec. At the same time 1600 cc./min. of the helium flow is bubbled through the chamber 27 which contains $TiCl_4$ (a colorless liquid) at room temperature. Analysis shows that the upflowing gas stream carries about 0.28 gram of titanium per gram of carbon.

The methane decomposes to deposit a dense pyrolytic graphite coating 11 over the spongy carbon coating. Under these coating conditions, the carbon deposition rate is about 12 microns per hour. The methane gas flow is continued until a pyrolytic graphite coating 11 about 85 microns thick is obtained. At this time the methane gas flow is terminated, and all the helium gas is directed around the chamber 27. The coated fuel particles 5 (FIGURE 1) are cooled fairly slowly in the helium stream and then removed from the reaction tube.

The resultant particles are examined and tested. The density of the outer pyrolytic graphite coating is found to be about 2.51 grams per cc. Analysis of this material shows that the titanium content is about 10 weight percent which is equal to about 2.7 atom percent titanium, based upon total atoms of titanium plus carbon. The titanium is uniformly distributed throughout the pyrolytic graphite structure in the form of titanium carbide. The Bacon Anisotropy Factor of the pyrolytic carbon measures about 2.3 and the apparent crystallite size ($L_c$) is about 900 A. X-ray diffraction determines that the crystalline structure is that of graphite and that the layer plane spacing averages about 3.35 A.

Testing of the coated particles is carried out by disposing them in a suitable capsule and subjecting them to neutron irradiation at an average temperature of about 1250° C. for about three months. During this time, the total fast-flux exposure is estimated to be about $2.4 \times 10^{21} nvt$ (using neutrons of energy greater than about 0.18 mev.). The term $nvt$ is expressed in terms of neutrons per square centimeter, and results from measurement of neutron density in neutrons per cc., neutron velocity in cm. per sec. and total duration of time in seconds. At the completion of this period of irradiation, the burn-up is estimated to be about 10 to 20 percent of the fissile atoms. The fuel particles 5 having this inner coating 9 of spongy pyrolytic carbon surrounded by the outer coating 11 of pyrolytic graphite exhibit no coating failures, and the fission product release fraction is within acceptable limits. The pyrolytic graphite-coated nuclear fuel particles 5 are considered excellently suited for use in high temperature nuclear reactors.

*Example II*

Additional 200 micron uranium carbide cores 7 are coated with a low density, shock-absorbing spongy carbon layer 9 as set forth in Example I above, about 25 microns thick. Spongy carbon-coated particles having a total surface area of about 800 square centimeters are fed into a 3.5 cm. diameter coater 21 which has been heated to 2100° C. A flow of helium gas of about 8800 cc. per minute is passed therethrough. When the temperature of the coated fuel particles reaches 2200° C., methane gas is added to the helium stream in an amount of about 1200 cc./min. to establish a methane partial pressure of about 0.12 (total pressure 1 atm.), the total flow rate of gas now being about 10,000 cc. per minute. This flow in 3.5 cm. diameter reaction tubes constitutes a contact time of about 0.1 sec. At the same time, 2800 cc./min. of the helium flow is bubbled through the chamber 27 which contains TiCl₄ (a colorless liquid) at room temperature. Analysis shows that the upflowing gas stream carries about 0.13 gram of titanium per gram of carbon.

The methane decomposes to deposit a dense Ti-containing pyrolytic carbon coating 11 over the spongy carbon coating. Under these coating conditions, the carbon deposition rate is about 67 microns per hour. The faster rate of deposition resulting from the use of a smaller bed surface area results in the deposition of turbostratic carbon rather than graphite, as might be expected from FIGURE 3 to result from this temperature partial pressure combination. The methane gas flow is continued until a pyrolytic carbon coating 11 about 85 microns thick is obtained. At this time the methane gas flow is terminated, and all the helium gas is directed around the chamber 27. The temperature is maintained at 2200° C. for four hours to cause the carbon to be graphitized by the catalyst. Then the coated fuel particles 5 are cooled fairly slowly in the helium stream and removed from the reaction tube.

The resultant particles are examined and tested. The density of the outer pyrolytic graphite coating is found to be about 2.35 grams per cc. Analysis of this material shows that the titanium content is about 6.4 weight percent which is equal to about 1.7 atom percent titanium, based upon total atoms of titanium plus carbon. The titanium is uniformly distributed throughout the pyrolytic graphite structure in the form of titanium carbide. The Bacon Anisotropy Factor of the pyrolytic carbon measures about 1.1 and the apparent crystallite size ($L_c$) is about 900 A. X-ray diffraction determines that the crystalline structure is that of graphite and that the layer plane spacing averages about 3.35 A.

The coated particles are subjected to neutron irradiation as in Example I. At the completion of this period of irradiation, the burn-up is estimated to be about 10 to 20 percent of the fissile atoms. The fuel particles 5 having this inner coating 9 of spongy pyrolytic carbon surrounded by the outer coating 11 of pyrolytic graphite exhibit no coating failures, and the fission product release fraction is below the accepable limit. The pyrolytic graphite-coated nuclear fuel particles 5 are considered excellently suited for use in high temperature nuclear reactors.

*Example III*

Additional 200 micron uranium carbide cores 7 are coated with a low density, shock-absorbing spongy carbon layer 9 as set forth in Example I above, about 25 microns thick. Spongy carbon-coated particles having a total surface area of about 2000 square centimeters are fed into a 3.5 cm. diameter coater 21 and are coated with an 85-micron thick coating of pyrolytic carbon using a bed temperature of 1225° C., a total gas flow rate of about 7500 cm.³/min. (contact time about 0.2 sec.) of a helium-methane mixture having a partial pressure of methane of about 0.4. The valves are set so as to divert about 1250 cc. per minute through the chamber 27 which contains liquid titanium tetrachloride at room temperature. Analysis of the upflowing gas stream shows that there is a concentration of titanium in an amount of about 0.02 gram per gram of carbon. Under these coating conditions, there is a deposition of about 17 microns of pyrolytic carbon per hour. When the desired coating thickness of about 85 microns is achieved, the flow of methane is discontinued. The flow of helium is diverted around the catalyst container 27, and particles are cooled and removed.

Examination of the coated particles shows that the density of the 85-micron thick outer coating is about 2.18 grams per cc. The testing of the structure shows that the titanium content is about 6.4 weight percent, which is equal to about 1.7 atom percent based upon total atoms of titanium plus carbon. From these figures, it can be calculated that the density of the pyrolytic carbon is about 94 percent of theoretical maximum density. The B.A.F. is in the neighborhood of about 2, and the apparent crystallite size is about 30 A. The pyrolytic carbon is generally laminar in structure, and the layer plane spacings measure about 3.44 A.

These particles are subsequently subjected to an annealing treatment using suitable means, for example, a vibrating tray furnace, at a temperature of about 2200° C. for about four hours. At the end of this annealing period, the particles are re-examined. The apparent crystallite size increases to about 840 A. X-ray diffraction shows that the pyrolytic carbon structure is changed from turbostratic to a nearly perfectly graphitic structure, and the layer plane spacing averages about 3.36 A.

The annealed particles 5 are subjected to neutron irradiation as in Example I. Burn-up of approximately 10 percent of the fissile atoms causes essentially no coating failures. The fission product release factor of the particles is below the acceptable limit. The coated particles 5 are considered to be well suited for use in a high temperature nuclear reactor.

*Example IV*

Additional 200 micron uranium carbide particles are coated with a low density, shock-absorbing spongy carbon layer 9 as set forth in Example I above, about 25 microns thick. The pyrolytic graphite-coating process set forth in Example I is then repeated, substituting silicon tetrachloride, a colorless liquid, for the titanium tetrachloride in the chamber 27. Coating under these conditions is continued until a layer 11 of dense pyrolytic graphite about 45 microns thick is deposited. Examination of this coating shows the structure to be that of pyrolytic graphite.

The temperature of the reaction tube 21 is lowered to about 1500° C., and hydrogen is substituted as the fluidizing gas. Approximately 10 percent of the hydrogen stream is bubbled through methyltrichlorosilane. Under these conditions, silicon carbide is deposited upon the outer surfaces of the particles until each is uniformly coated with a layer about 10 microns thick. Examination and measurement shows that the density of the silicon carbide is about 99 percent of maximum theoretical density.

The particles are then returned to the coating apparatus, and the conditions previously employed to deposit the pyrolytic graphite coating re-established. An outer coating 17 about 25 microns thick of dense pyrolytic graphite is deposited.

These particles 13 are irradiated under the conditions set forth in Example I. After a burn-up of about 10 percent of the fissile atoms, no coating failures are apparent. The fission product retention of these particles is considered excellent, being well within the acceptable limits.

Although the invention has been particularly described with respect to uranium dicarbide, it should be understood that other fissionable materials and fertile materials can likewise be provided with protective coatings to afford them the increased high temperature and neutron irradiation stability. For example, mixtures of uranium carbide and thorium carbide may be advantageously coated. Various features of the invention are set forth in the following claims.

What is claimed is:

1. A nuclear fuel particle comprising a core of fissile or fertile material and a fission-product retentive coating completely surrounding said core including a layer of pyrolytic graphite having a well-defined three-dimensional crystalline structure and a layer plane spacing of from 3.35 to about 3.37 A.

2. A nuclear fuel particle in accordance with claim 1 wherein said pyrolytic graphite layer includes a catalyst in elemental or compound form selected from the group consisting of titanium, zirconium, silicon, niobium, beryllium, vanadium, hafnium, nickel, iron, tantalum, tungsten, molybdenum, chromium, manganese, boron, calcium, scandium, strontium, yttrium, technetium, the lanthanide and actinide series elements and mixtures thereof.

3. A nuclear fuel particle in accordance with claim 2 wherein said layer of pyrolytic graphite has a thickness of at least about 10 microns.

4. A nuclear fuel particle in accordance with claim 3 wherein a layer of relatively low density spongy pyrolytic carbon of at least about 20 microns is disposed intermediate said core and said pyrolytic graphite coating.

5. A nuclear fuel particle in accordance with claim 4 wherein said catalyst is present in the form of zirconium, silicon, beryllium or niobium carbide.

6. A nuclear fuel particle in acordance with claim 3 wherein a layer of dense silicon carbide surounds and is disposed immediately adjacent to said layer of pyrolytic graphite.

7. A nuclear fuel particle in accordance with claim 6 wherein a second layer of pyrolytic graphite surrounds said silicon carbide layer and is disposed immediately adjacent thereto.

8. A nuclear fuel particle in accordance with claim 3 wherein zirconium, silicon, beryllium or niobium is present in an amount of at least about 0.5 atom percent based on total atoms of metal catalyst plus carbon.

9. A nuclear fuel particle in accordance with claim 3 wherein the apparent crystallite size of said pyrolytic graphite is at least about 500 A.

10. A nuclear fuel particle in accordance with claim 7 wherein the thickness of the total coating is at least equal to about 35% of the particle size of the nuclear fuel core.

References Cited

UNITED STATES PATENTS

| | | | |
|---|---|---|---|
| 2,988,522 | 6/1961 | Smith et al. | 106—56 X |
| 3,037,756 | 6/1962 | Ornitz | 106—56 X |
| 3,097,151 | 7/1963 | Martin | 106—56 X |
| 3,153,636 | 10/1964 | Shanta et al. | 106—56 |
| 3,260,466 | 7/1966 | Wagner et al. | 176—91 X |
| 3,276,968 | 10/1966 | Ingleby | 176—91 X |
| 3,298,921 | 1/1967 | Bokros et al. | 176—91 X |
| 3,301,763 | 1/1967 | Beatly et al. | 176—67 |
| 3,306,825 | 2/1967 | Finicle | 176—67 |
| 3,312,597 | 4/1967 | Glneckauf | 176—91 X |

FOREIGN PATENTS 1,389,958  1/1965  France.

OTHER REFERENCES

Reactor Materials, "Recent Developments With Coated-Particle Fuel Materials," J. H. Oxley, Vol. 6, No. 2, May 1963, pages 6, 7 and 8.

Reactor Materials, Vol. 8, No. 4, winter 1965–1966, pages 186 and 187.

CARL D. QUARFORTH, *Primary Examiner.*

M. J. SCOLNICK, *Assistant Examiner.*